US012694586B2

(12) United States Patent
Peskin et al.

(10) Patent No.: US 12,694,586 B2
(45) Date of Patent: Jul. 28, 2026

(54) CUSTOM VISUALIZATIONS OF DATA WITHIN COMPLEX SYSTEMS

(71) Applicant: Ventacity Systems Inc., Portland, OR (US)

(72) Inventors: Jonah Peskin, Hood River, OR (US); Xuan Cen Cheng, West Lynn, OR (US); Patrick J. Nystrom, Corbett, OR (US); Salvatore D'Auria, Mt. Hood, OR (US)

(73) Assignee: Ventacity Systems Inc., Portland, OR (US)

( * ) Notice: Subject to any disclaimer, the term of this patent is extended or adjusted under 35 U.S.C. 154(b) by 120 days.

(21) Appl. No.: 18/898,546

(22) Filed: Sep. 26, 2024

(65) Prior Publication Data

US 2025/0104303 A1 Mar. 27, 2025

Related U.S. Application Data

(60) Provisional application No. 63/585,525, filed on Sep. 26, 2023.

(51) Int. Cl.
| | |
|---|---|
| *G06F 9/451* | (2018.01) |
| *G06F 3/0482* | (2013.01) |
| *G06F 3/04842* | (2022.01) |
| *G06T 11/26* | (2026.01) |

(52) U.S. Cl.
CPC ............ *G06T 11/26* (2026.01); *G06F 3/0482* (2013.01); *G06F 3/04842* (2013.01); *G06F 9/451* (2018.02)

(58) Field of Classification Search
CPC ................................. G06T 11/26; G06F 9/451
See application file for complete search history.

(56) References Cited

U.S. PATENT DOCUMENTS

| | | | | |
|---|---|---|---|---|
| 6,446,239 B1* | 9/2002 | Markosian | ............ | G06F 30/392 |
| | | | | 716/135 |
| 6,449,761 B1* | 9/2002 | Greidinger | ............ | G06F 30/392 |
| | | | | 716/122 |
| 6,463,552 B1* | 10/2002 | Jibbe | .................... | G06F 9/45512 |
| | | | | 714/33 |
| 8,479,105 B2* | 7/2013 | Gamaley | ................ | G06Q 10/10 |
| | | | | 715/753 |

(Continued)

*Primary Examiner* — Irfan Habib
(74) *Attorney, Agent, or Firm* — Holzer Patel Drennan

(57) ABSTRACT

A computing system generates a user interface for dynamically visualizing parameters in a complex system. The user interface includes a system diagram viewer configured to display respective ones of a plurality of system diagrams, where each of the system diagrams includes at least one selectable identifier that represents a parameter within a system or environment represented by the system diagram. The user interface further includes a persistent parameter list associated with the plurality of system diagrams, where the persistent parameter list maintains a set of parameters selected by a user as the user interacts with the system diagram viewer. When a user interaction with a first selectable identifier is received, a parameter represented by the first selectable identifiers is added to the set of parameters maintained in the persistent parameter list. The computing system generates a visualization of the set of parameters maintained in the persistent parameter list.

17 Claims, 12 Drawing Sheets

CAUSE DISPLAY, BY A COMPUTING DEVICE, OF A USER INTERFACE THAT INCLUDES A SYSTEM DIAGRAM VIEWER AND A PERSISTENT PARAMETER LIST
802

RECEIVE A USER INTERACTION WITH AT LEAST A FIRST SELECTABLE IDENTIFIER ON A RESPECTIVE SYSTEM DIAGRAM
804

IN RESPONSE TO THE USER INTERACTION, ADD A FIRST PARAMETER, REPRESENTED BY THE FIRST SELECTABLE IDENTIFIER, TO THE SET OF PARAMETERS MAINTAINED IN THE PERSISTENT PARAMETER LIST
806

GENERATE A VISUALIZATION OF THE SET OF PARAMETERS MAINTAINED IN THE PERSISTENT PARAMETER LIST
808

(56) References Cited

U.S. PATENT DOCUMENTS

| | | | | |
|---|---|---|---|---|
| 8,855,983 | B2 * | 10/2014 | Wey | G06F 8/10 |
| | | | | 703/6 |
| 9,811,233 | B2 * | 11/2017 | Abaya | G06F 9/451 |
| 10,225,389 | B2 * | 3/2019 | Lindberg | H04M 1/72469 |
| 10,764,157 | B2 * | 9/2020 | Jeon | H04L 12/2816 |
| 10,803,684 | B2 * | 10/2020 | Gowda | G07C 5/0825 |
| 11,194,471 | B1 * | 12/2021 | Jacome | G06F 3/04842 |
| 11,789,755 | B2 * | 10/2023 | Schimon | G06T 13/80 |
| | | | | 715/744 |
| 12,243,178 | B2 * | 3/2025 | Caswell | G06T 19/006 |
| 12,248,671 | B2 * | 3/2025 | Ma | G06F 3/04847 |
| 2005/0027376 | A1 * | 2/2005 | Lucas | G06F 21/6227 |
| | | | | 700/83 |
| 2010/0094922 | A1 * | 4/2010 | Sathish | H04M 1/72403 |
| | | | | 709/201 |
| 2010/0140364 | A1 * | 6/2010 | Nordberg | G05B 15/02 |
| | | | | 236/51 |
| 2014/0096092 | A1 * | 4/2014 | Johnson | G06F 3/0485 |
| | | | | 715/863 |
| 2014/0229846 | A1 * | 8/2014 | Abaya | G06F 9/451 |
| | | | | 715/744 |
| 2020/0142547 | A1 * | 5/2020 | Carrasco | G06F 8/38 |
| 2022/0374251 | A1 * | 11/2022 | Schimon | H04L 67/60 |
| 2025/0390204 | A1 * | 12/2025 | Kapinos | G06F 3/04842 |

* cited by examiner

242
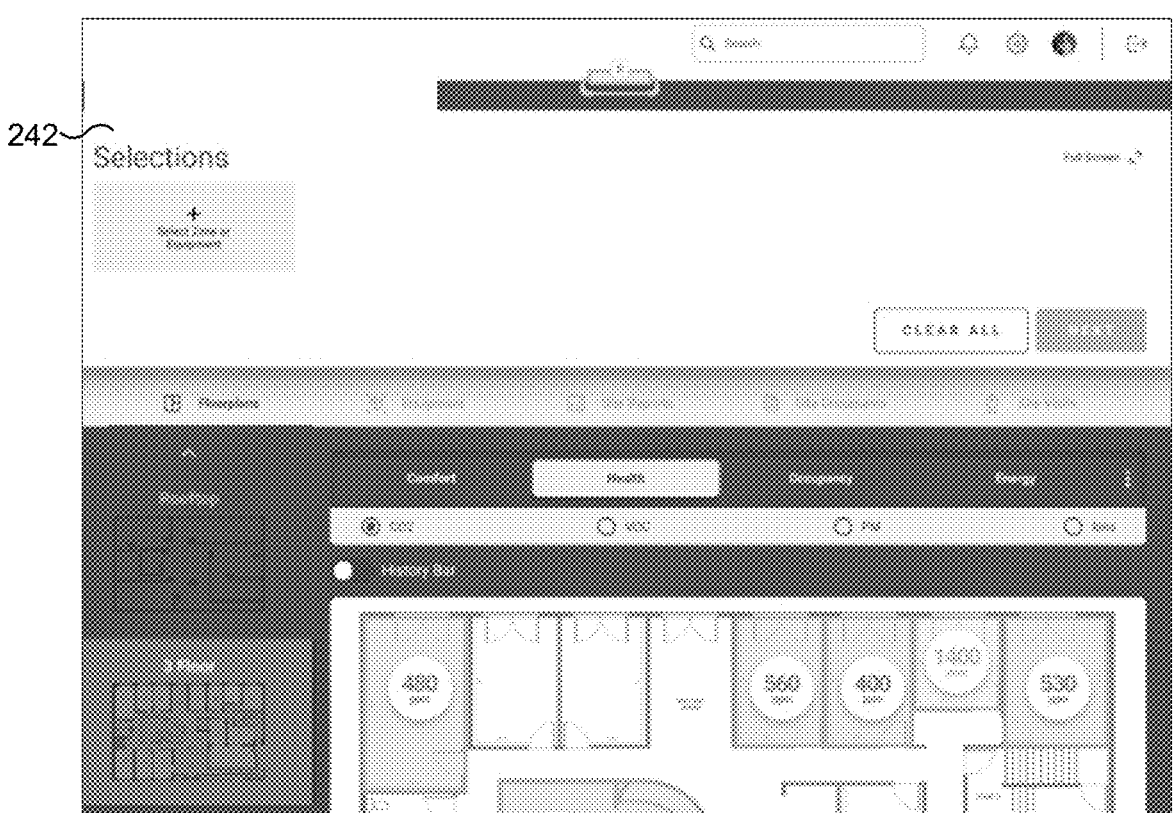
*FIG. 3A*
242
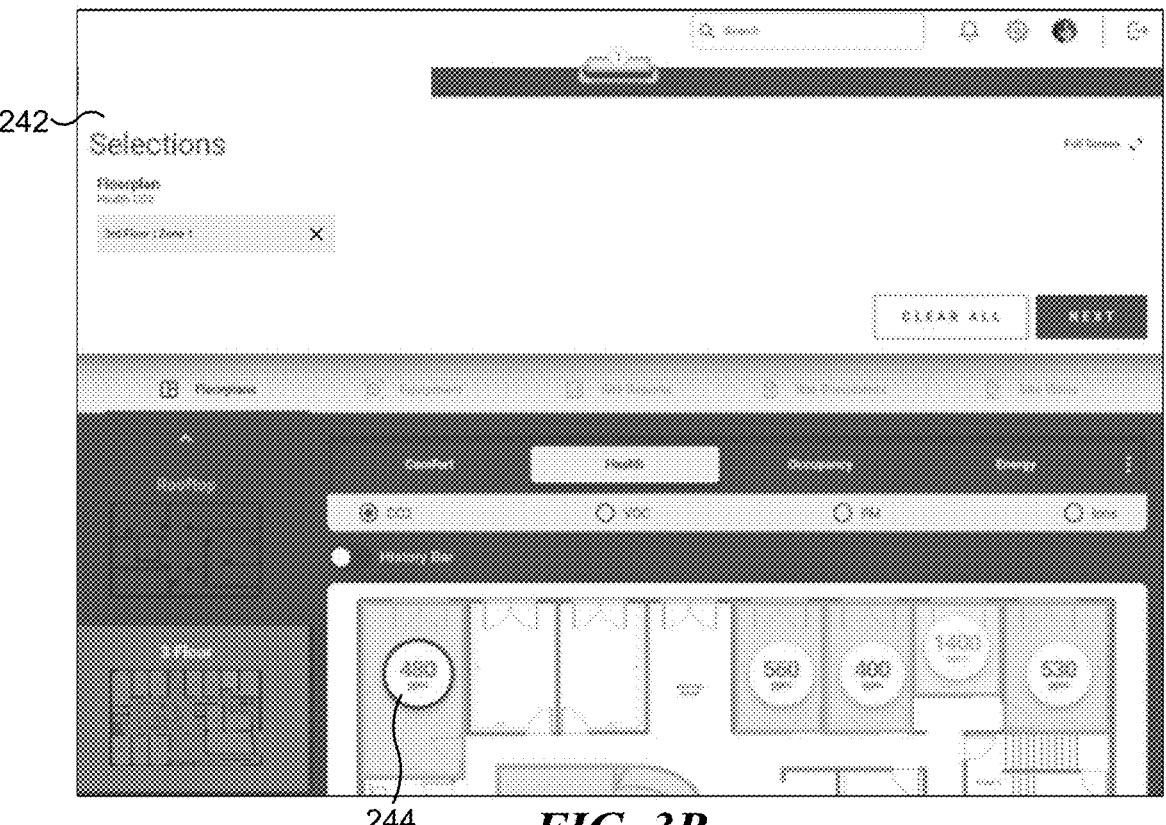
244      *FIG. 3B*

302

302   304   306

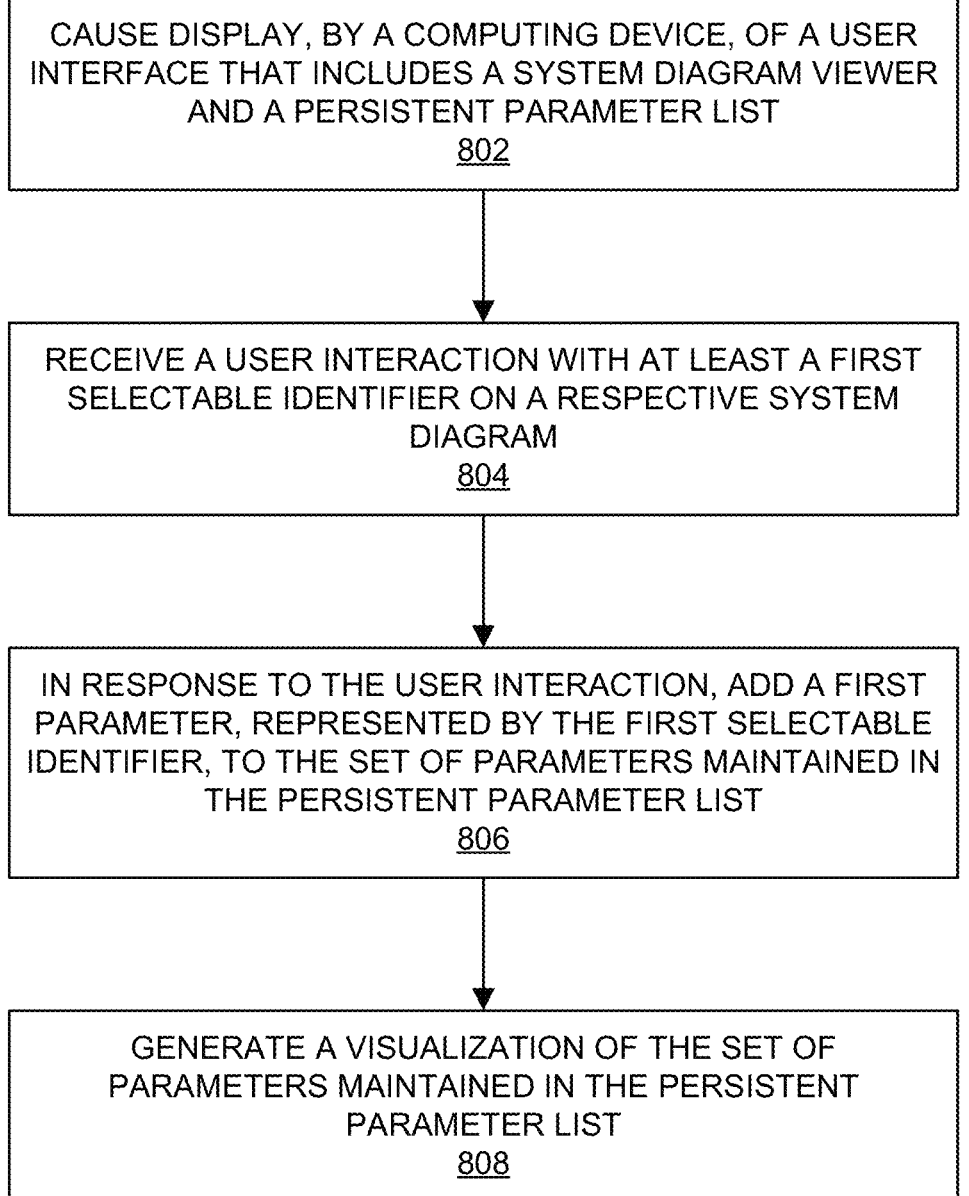

CAUSE DISPLAY, BY A COMPUTING DEVICE, OF A USER INTERFACE THAT INCLUDES A SYSTEM DIAGRAM VIEWER AND A PERSISTENT PARAMETER LIST
802

RECEIVE A USER INTERACTION WITH AT LEAST A FIRST SELECTABLE IDENTIFIER ON A RESPECTIVE SYSTEM DIAGRAM
804

IN RESPONSE TO THE USER INTERACTION, ADD A FIRST PARAMETER, REPRESENTED BY THE FIRST SELECTABLE IDENTIFIER, TO THE SET OF PARAMETERS MAINTAINED IN THE PERSISTENT PARAMETER LIST
806

GENERATE A VISUALIZATION OF THE SET OF PARAMETERS MAINTAINED IN THE PERSISTENT PARAMETER LIST
808

*FIG. 8*

CUSTOM VISUALIZATIONS OF DATA WITHIN COMPLEX SYSTEMS

CROSS-REFERENCE TO RELATED APPLICATION

This application claims the benefit of U.S. Provisional Patent Application No. 63/585,525, filed Sep. 26, 2023, which is incorporated herein by reference in its entirety.

BACKGROUND

Many systems involve parameters that need to be monitored and analyzed to derive insights about the performance of the system, to detect errors or inefficiencies in the system, or to predict future performance of the system itself or other systems that use or rely on the system. These parameters can range from simple numerical values to complex categorical data, and often have complex interdependencies. For instance, industrial processes, environmental monitoring systems, and complex machinery all generate vast amounts of data across numerous parameters. The volume and complexity of this data can make it challenging for users to derive meaningful insights.

BRIEF DESCRIPTION OF FIGURES

Detailed descriptions of implementations of the present invention will be described and explained through the use of the accompanying drawings.

FIGS. 3A-3D illustrate an example parameter list viewer displayed in a user interface.

FIG. 8 is a flowchart illustrating a process for generating visualizations of complex systems, according to some implementations.

Figure 1:
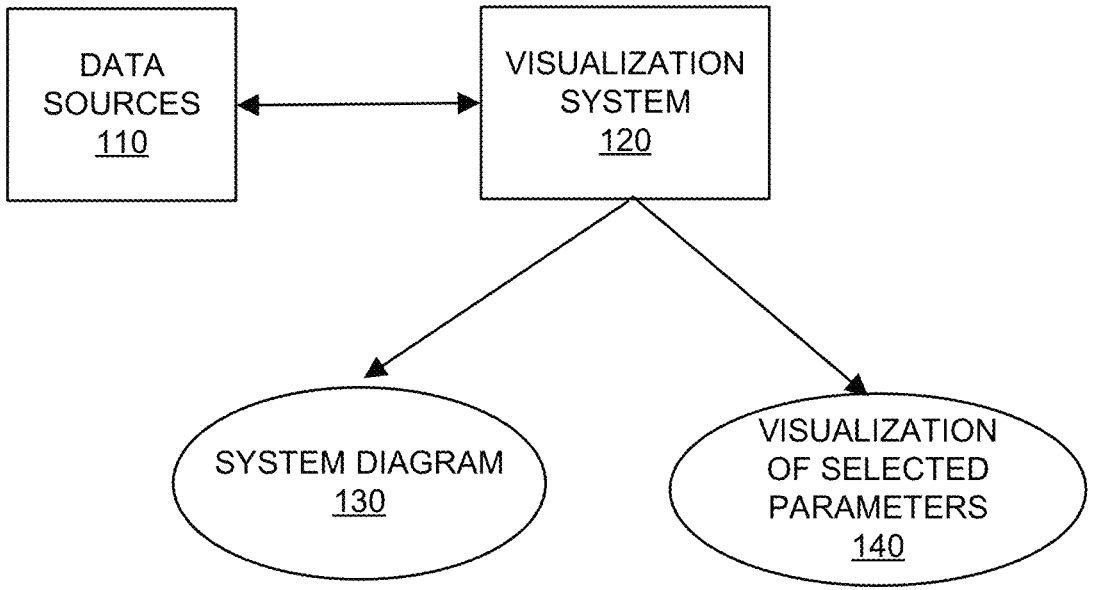
FIG. 1 is a high-level block diagram illustrating a computing environment in which a visualization system operates, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A visualization system generates custom visualizations of parameters that are measured in or related to operation of a system or physical environment. Data sources for parameters of the system or environment can be linked to the visualization system. The visualization system outputs user interfaces representing the system or environment and the parameters of the system or environment that have been linked to the visualization system. Each of the parameters is represented with a selectable identifier. A user can interact with the selectable identifiers to select one or more parameters to visualize, which are maintained in a persistent parameter list that is accessible across multiple system diagrams. Based on the parameters selected by the user, the visualization system generates a visualization.

Visualizations of parameters can help a user understand the state of operation of a system or environment, detect anomalies, predict failures, or improve performance. For some systems or environments, the location from which a parameter was measured is an important factor for a user's understanding of the parameter or the effect of the parameter on the system or environment. For example, when the parameters relate to physical properties in a building, a person can more readily understand the physical properties or how they relate to one another when these properties are displayed on a floorplan of the building. Similarly, a maintenance technician for a machine may be able to quickly ascertain the status of the machine when the machine's parameters are mapped to spatial locations on the machine. Accordingly, the visualization system according to implementations herein enables a user to select parameters to visualize from a system diagram. Once a set of parameters have been selected, the visualization system facilitates a process for generating a chart, a graph, a table, or another type of visualization of the selected parameters.

Furthermore, by maintaining the persistent parameter list across system diagrams, implementations described herein enable a user to easily track and compare data across different system diagrams without losing the selections. The flexibility of the persistent parameter list enables a user to easily compare, track, and visualize parameters that may be related, even if these parameters are part of different systems or environments. For example, a user can detect abnormalities or inefficiencies in the performance of an HVAC system from a visualization that plots an HVAC machine's supply air temperature against air temperatures in rooms regulated by the HVAC machine. In another example, a user can derive insights by comparing room temperatures and occupation levels between two or more similar buildings.

In some implementations, a computing system causes a computing device to display a user interface. The user interface includes a system diagram viewer configured to display respective ones of a plurality of system diagrams, where at least one of the system diagrams includes at least one selectable identifier that represents a parameter within a system or environment represented by the system diagram. User inputs at the computing device to navigate between the plurality of system diagrams cause the computing device to display respective system diagrams from the plurality of system diagrams in the system diagram viewer. The user interface further includes a persistent parameter list associated with the plurality of system diagrams, where the persistent parameter list maintains a set of parameters selected by a user as the user interacts with the system diagram viewer. When a user interaction with a first selectable identifier is received, a parameter represented by the first selectable identifiers is added to the set of parameters maintained in the persistent parameter list. The computing system then is configured to generate a visualization of the set of parameters maintained in the persistent parameter list.

FIG. 1 is a high-level block diagram illustrating a computing environment in which a visualization system 120 operates, according to some implementations. As shown in FIG. 1, the visualization system 120 communicates with data sources 110 to receive data associated with one or more parameters. The visualization system 120 generates one or more system diagrams 130 that each visually represent a system or environment. Parameters within the system or environment can be represented on these system diagrams 130, for example by the visualization system 120 populating the system diagrams with values of the parameters that are received from the data sources 110. The visualization system 120 also generates custom visualizations 140 of user-selected parameters based on data received from the data sources 110. Implementations of the visualization system described herein can be used to generate custom visualizations for any system or environment in which parameters of interest are associated with spatial locations relative to the system or environment or for which the location from which a parameter was measured is an important factor for a user's understanding of the parameter.

The data sources 110 represent devices or systems that generate data for respective parameters of a system or environment. The data sources 110 can include, for example, sensors that are placed at certain locations in or near the system or environment to measure data of respective parameters at those locations. Example sensors include temperature sensors, pressure sensors, humidity sensors, carbon dioxide sensors, volatile organic compound sensors, particulate matter sensors, air velocity sensors, accelerometers, light detectors, or any other sensor that is able to measure a physical property of an environment or system. Other data sources can include systems that receive streams of sensor data from one or more sensors and transmit the data streams to the visualization system. For example, multiple sensors in a building can communicate with a central hub or multiple sensors in a machine can communicate with the machine's central controller, where the hub or central controller in turn communicates with the visualization system. Still other data sources can include computing systems or other electronic devices that generate streams of data externally from but related to a given system or environment. For example, the visualization system can receive weather data, such as outdoor temperature, humidity, pressure, or air quality measurements, from a public or private weather monitoring system. Finally, some of the data sources can include computing systems that derive values of a parameter from values of one or more other parameters. In one example, a comfort parameter is a derived parameter that represents a person's perception of thermal comfort in a room and is derived from air temperature, surface temperature, humidity, and/or airflow in the room. Economic efficiency of an HVAC system can be derived from parameters such as temperature in a room, air exchanges per hour in the room, outside temperature, times of day the HVAC system is operating, and costs of electricity during the times the HVAC system is running. Still another derived parameter can be a number of alerts that have occurred for a given system or at a given location, where an alert is triggered if one or more other parameters satisfy an alert criterion (e.g., if temperature in a room exceeds a temperature alert threshold or if an economic efficiency of an HVAC system falls below an efficiency threshold).

At least some of the data sources 110 can be registered to or linked to the visualization system 120 such that the visualization system receives data from the data sources 110. Data from the data sources can be received at the visualization system 120 on a continuous basis or on a periodic basis. Furthermore, data may be transmitted to the visualization system 120 automatically when it is generated, or the visualization system may periodically query the data sources 110 for the data.

For at least some of the parameters measured by the data sources 110, thresholds can be used to delineate different ranges of the parameters' values. The ranges can reflect values of a given parameter that are or are not likely to have a detrimental effect on a component of the system or environment or a person in or interacting with the system or environment. For example, thresholds can be used to define ranges of parameter values that are "ok," "warning," or "critical." These thresholds can be preconfigured within the visualization system based on user input or based on third party standards (e.g., a rule issued by an agency that defines a safe temperature range for a walk-in freezer in a restaurant). Other thresholds can be processed dynamically by the visualization system. For example, a threshold for a given parameter can be dynamically set at the value that is one standard deviation above a mean value of the parameter over the previous 30 days. Any number of thresholds can be set for each parameter, and thus any number of ranges of values can be defined for the parameter.

The visualization system 120 generates user interfaces that enable a user to select parameters to visualize. These user interfaces can take the form of a system diagram 130 of a system or environment, where parameters measured in or associated with the system or environment can be depicted on or with the system diagram. Example types of system diagrams 130 include a floorplan of a building, a diagram of a machine, or a map of a geographic area such as a neighborhood, a city, or a country. The system diagrams can be ingested by the visualization system or automatically created by the visualization system. In one example, a user uploads a floorplan of a building to the visualization system. As the user registers data sources to the visualization system, the user indicates the location on the floorplan of the parameter or parameters measured by or generated by each data source. For example, the user specifies the location of a sensor that is measuring a given parameter or identifies a room for which a given parameter is being measured or derived. Alternatively, the visualization system may automatically map a parameter to a determined location on the system diagram.

The visualization system 120 also generates visualizations 140 of parameters. Visualizations can include any of a variety of different types of charts, plots, tables, or other visual representations of data, including but not limited to pie charts, bar charts, line charts, basic or stacked column charts, gauge diagrams, spiderweb plots, scatter plots, heat maps, histograms, area charts, bubble charts, or waterfall charts. The visualization system 120 dynamically generates visualizations of any parameters selected by a user.

User Interface for System Diagrams

The system diagrams and visualizations that are generated by the visualization system 120 can be output to a user via a user interface displayed by a user computing device, such as a laptop or desktop computer, a mobile phone, a tablet, or any other computing device that is capable of displaying information and receiving user inputs. Example user interfaces and user interactions with these interfaces are illustrated in FIGS. 2-7.

Figure 2A:
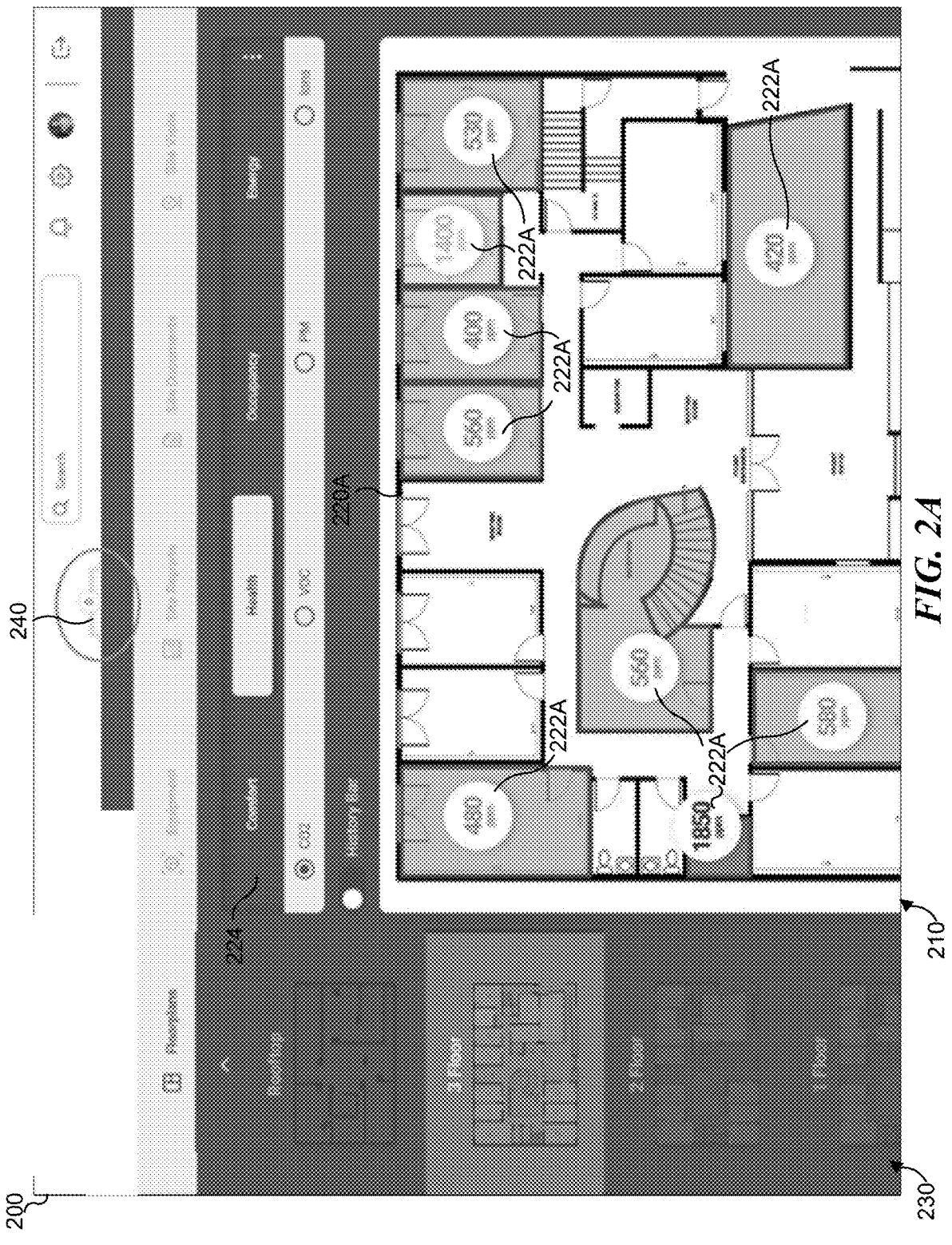
FIGS. 2A-2C illustrate example system diagrams displayed in a user interface.

An example user interface 200 generated by the visualization system 120 is shown in FIG. 2A. The interface 200 includes a system diagram viewer 210, a system diagram picker 230, and a persistent parameter list 240. The system diagram viewer 210 is configured to display system diagrams, such as the system diagram 220A. The system diagram picker 230 displays identifiers of various system diagrams that are available to the user, enabling the user to navigate between multiple system diagrams. When a diagram is selected in the picker 230, the selected diagram is displayed in the system diagram viewer 210. Each system diagram can display data associated with one or more parameters that are measured in the system or environment represented by the diagram. The system diagrams can also include selectable identifiers of these parameters, where a user interaction with the selectable identifier (e.g., clicking on or tapping the identifier) adds the corresponding parameter to a list of parameters to be visualized. The persistent parameter list 240 maintains a set of parameters selected by a user as the user interacts with system diagrams in the system diagram viewer 210. In at least some implementations, the selectable identifiers can be displayed at locations on the system diagrams that approximately correspond to the location of the associated parameter within the system or environment, spatially correlating the selectable indicators to the physical locations of these parameters in order to provide an intuitive interface for a user to visualize the parameters.

In the example of FIG. 2A, the system diagram 220A is a building floorplan. The floorplan includes a layout of several floors in a building. Each floor of the building may have various rooms or assets that have parameters monitored by sensors, computing devices, or other electronic devices, resulting in parameters that are linked to various locations throughout the building. These parameters are depicted on the example floorplan in FIG. 2A by selectable indicators 222 that are placed at a location approximately corresponding to the location from which the parameter was generated. For example, in FIG. 2A, the floorplan illustrates carbon dioxide measurements in several rooms by displaying a numerical indicator on the portion of the diagram that represents each room and color-coding each room on the diagram. Either the numerical indicator or the portion of the diagram that represents the room can be selectable to add the corresponding parameter to the persistent parameter list 240. Alternatively, selectable identifiers can be provided at other locations on the user interface 200, such as in a list adjacent to the system diagram in the system diagram viewer 210.

The visualization system can update the indicators 222A on a periodic basis or upon a change in the parameters they represent, such that the floorplan system diagram represents a real-time or near real-time state of the building. Alternatively, the indicators 222A can represent an average value of the measurements taken over a certain time period (e.g., a previous day) or a percentage of measurements that exceeded or fell below a baseline measurement of the parameter. Likewise, some implementations of the indicators 222A display only a qualitative assessment of the parameters, such as color coding or symbols that indicate whether the current value of the parameter falls in an acceptable range or an unacceptable range. The user interface depicted in FIG. 2A enables a user to switch the view to display various different parameters that are measured in the building, including comfort parameters, health parameters, occupancy parameters, and energy parameters, by selecting the desired parameter from a menu 224. As the user switches between the parameters displayed on the floorplan, the underlying floorplan can remain constant while the numerical indicators 222A and/or color-coding of the rooms changes.

Figure 2B:
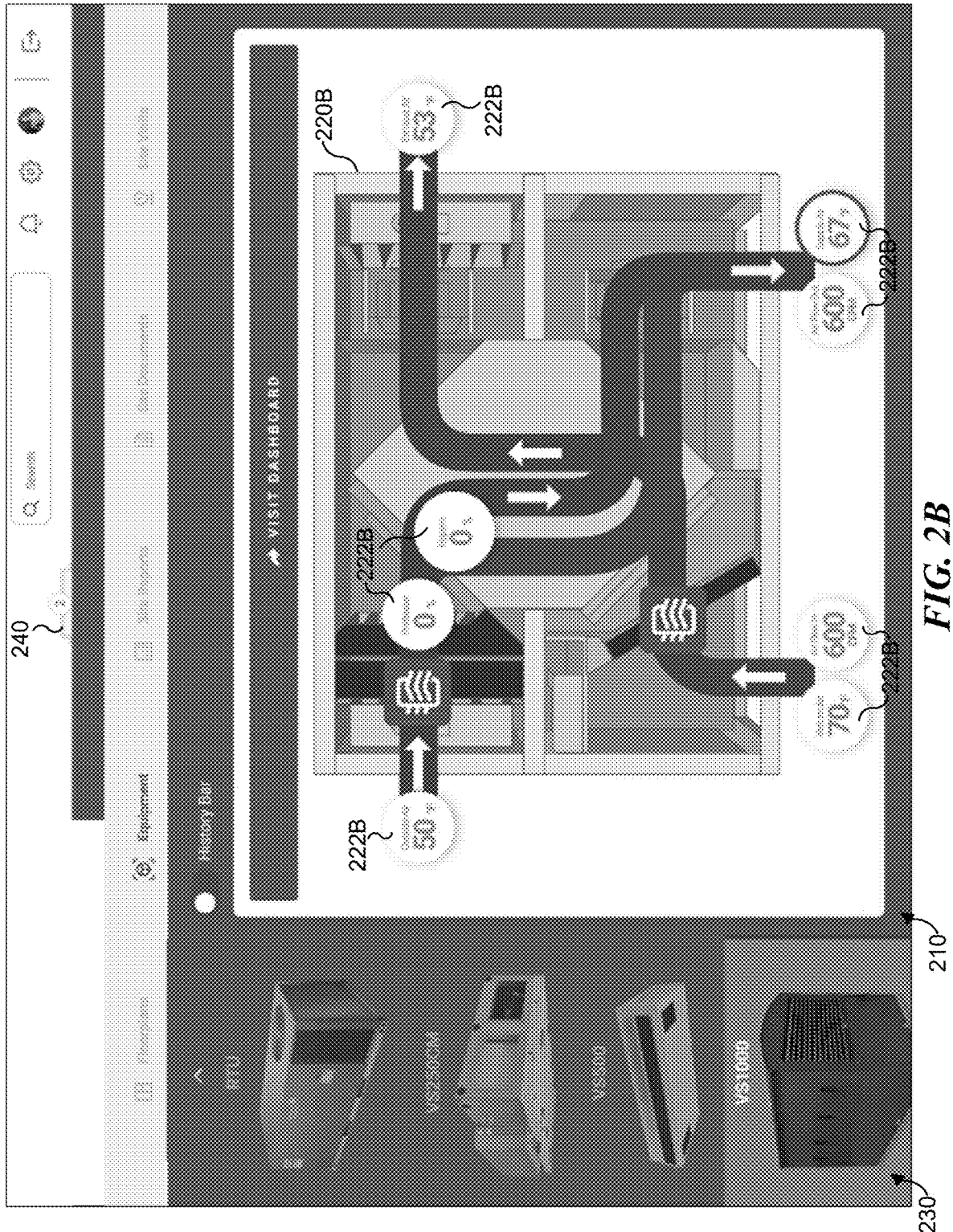

FIG. 2B illustrates an example machine diagram 220B, as another type of system diagram that can be generated by the visualization system 120 and displayed in the system diagram viewer 210. The machine system diagram illustrates several parameters measured in or near the machine and depicts the locations of these parameters by indicators 222B that are placed on the diagram at locations that approximately correspond to the locations at which the parameters are measured. Example parameters measured for the machine include air temperatures measured at inputs and outputs, air flow at inputs and outputs, and percentages of preheating or bypass applied. Like the indicators 222A displayed on the floorplan shown in FIG. 2A, the indicators 222B on the machine diagram can be real-time or near real-time values of the corresponding parameters as received from applicable data sources, values that are averaged over time, a percentage of measurements that exceeded or fell below a baseline measurement of the parameter, or qualitative assessments of the parameters.

The user interface depicted in FIG. 2B enables the user to view machine diagrams for multiple machines, for example by selecting different machines from the system diagram picker 230. The machine diagrams displayed in the user interface depicted in FIG. 2B can include, for example, any machines in a particular building for which data sources are linked to the visualization system 120. Users such as building maintenance teams can therefore switch between floorplan views and machine diagram views to assess the current values of various parameters, diagnose problems or errors in the building, and select parameters to visualize. In another example, the machines displayed in the user interface depicted in FIG. 2B can be a set of machines linked to a particular user account, even if the machines are not located in the same building. A company that is contracted to maintain machines in several buildings may monitor these machines through the same user interface, for example.

Figure 2C:
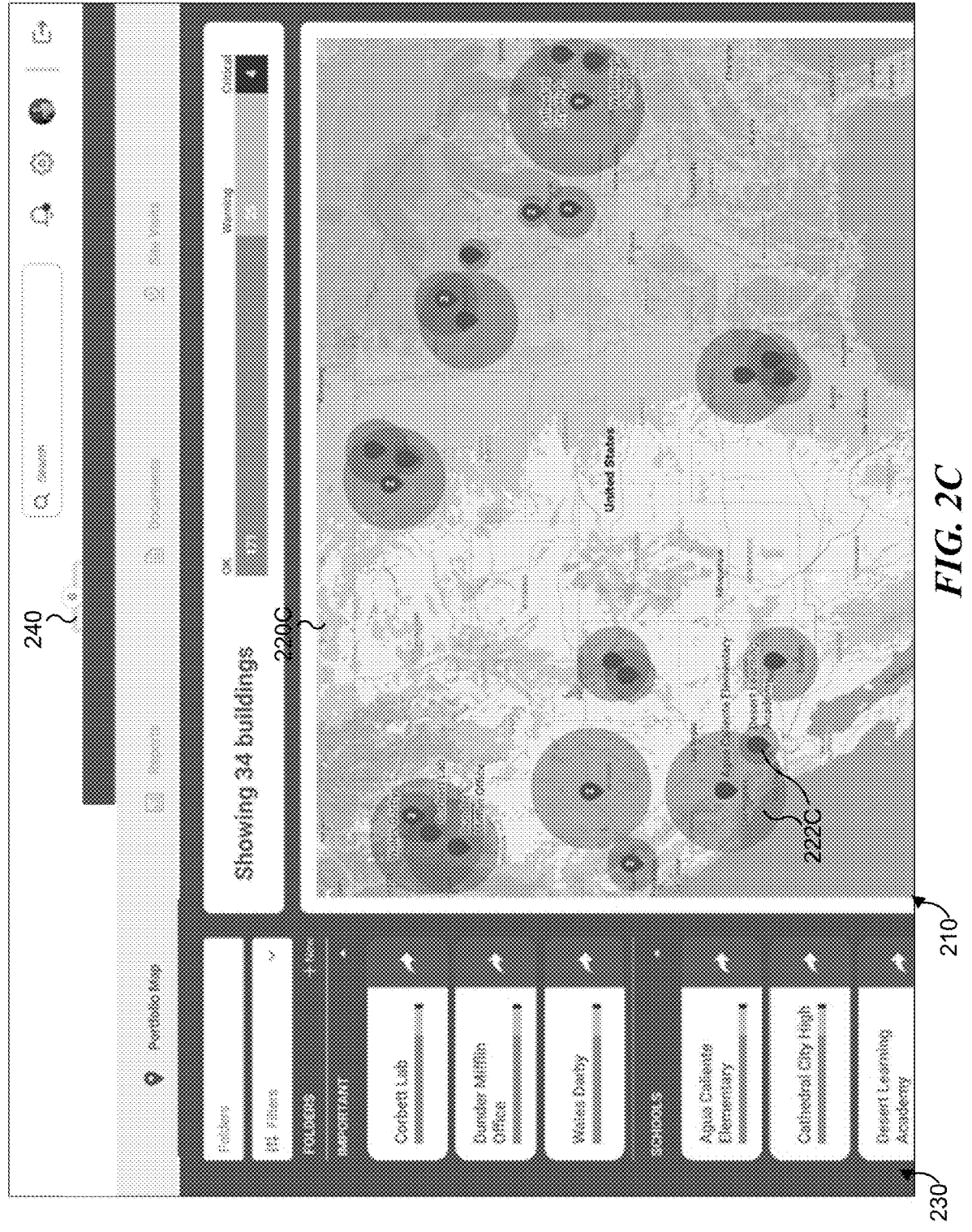

FIG. 2C illustrates, as another example type of system diagram, a map 220C of a geographic area. The map view depicts indicators 222C of parameters that are measured at various locations in the geographic area or computed based on multiple measurements at the locations. For example, the map view can depict indicators of parameters such as current temperature, humidity, or UV index measured at various locations. In another example, the map view depicts indicators of total energy usage of a building or set of buildings, energy efficiency of a building, occupancy of a building, or a number of alerts generated in a building over the previous day.

The map view shown in FIG. 2C can be filtered to display a subset of parameter indicators. For example, the parameter indicators can be filtered to a portion of the geographic area, based on a type of building in which the parameter is being measured, based on the status of the parameters (e.g., filtering to buildings in which a parameter is currently in a "critical" state), or based on other factors.

In some implementations, a user can navigate between multiple system diagrams displayed in the system diagram viewer 210, including navigating between the example diagrams illustrated in FIGS. 2A-2C. In the example of FIG. 2C, a list of buildings is displayed within the system diagram picker 230. When a building from this list is selected, a floorplan view of the building (e.g., as illustrated in FIG. 2A) is displayed in the system diagram viewer 210. A user can navigate between different floorplan system diagrams, such as floorplans of different floors within the building. From the floorplan view, a user can navigate to the machine system diagrams of any machines in the building (as illustrated in FIG. 2B), causing the machine system diagram to be displayed in the system diagram viewer 210. The indicators in FIG. 2C can instead be selectable to navigate to building floorplans, machine system diagrams, or other system diagrams of parameters corresponding to the selected indicator.

User Interfaces for Dynamic Parameter Visualization

Each of the user interfaces illustrated in FIGS. 2A-2C include a persistent parameter list 240. In some implementations, the persistent parameter list 240 is represented by a clipboard affordance displayed within the user interface 200. By interacting with the clipboard affordance that maintains the persistent parameter list 240, a user can select parameters from various system diagrams and add these parameters to the list (e.g., a "clipboard") that persistently maintains identifiers of the parameters selected by a user.

Figure 3C:
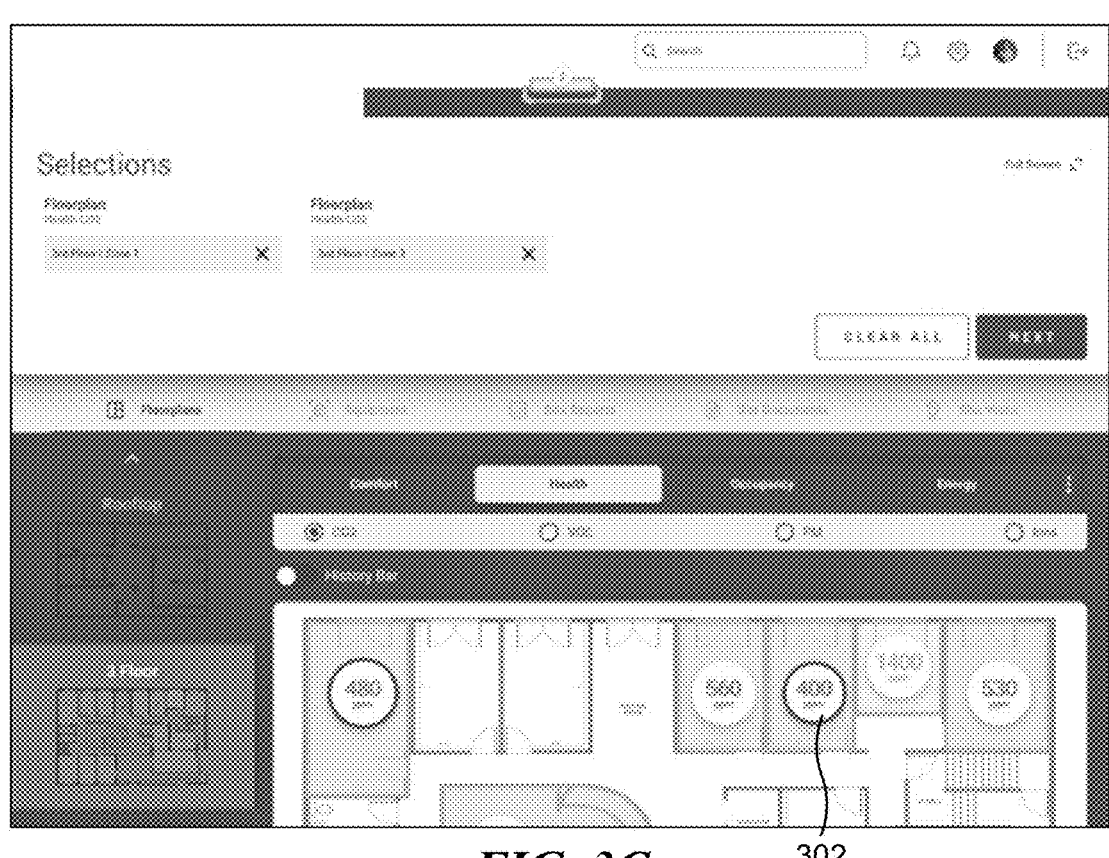

FIGS. 3A-3D illustrate an example parameter list viewer 242 that is displayed when the clipboard affordance is selected. In some implementations, opening the clipboard affordance (as shown in FIG. 3A) enables a visualization selection mode. In the visualization selection mode, a user can select parameters from the system diagram to add the selected parameters to the clipboard by interacting with (e.g., clicking on or tapping) the selectable identifiers of the parameters that are displayed within the system diagram.

Figure 3D:
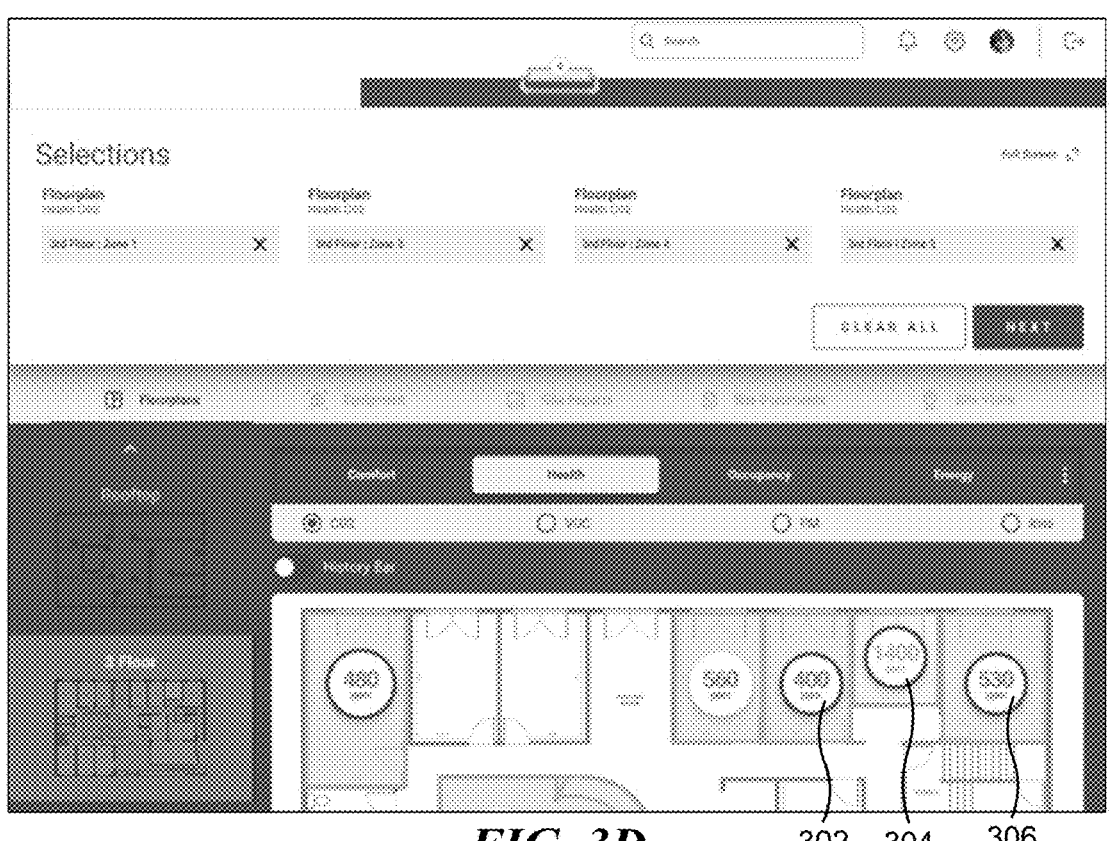

FIGS. 3B-3D illustrate successive parameters that have been selected by a user and added to the clipboard. Names of the selected parameters can be displayed within the parameter list viewer 242. For example, in FIG. 3B, the user has selected the carbon dioxide measurement in a certain room of a building ("$3^{rd}$ Floor, Zone 1") by interacting with the selectable identifier 244 on the system diagram that displays the building's floorplan. In FIGS. 3C and 3D, the user selected additional parameters by interacting with corresponding selectable identifiers 302, 304, and 306.

In some implementations, the selectable identifiers displayed on the system diagram are modified when a parameter is added to the clipboard. For example, the identifier 244 of the "$3^{rd}$ Floor, Zone 1" $CO_2$ parameter is outlined with a border to emphasize the indicator. Alternatively, the color, size, font size, font style, or other attributes of the indicator can be altered to visually indicate that a particular parameter has been added to the persistent parameter list. A user can therefore see which parameters have been selected on a system diagram that is readily understandable to view and study the behavior of elements of the system. Furthermore, in implementations where the identifiers display live or near-live values of the parameters, a user can observe changes to the values to inform the user as to which parameters may be useful to collect for further study. The user can also see which parameters have been selected in list form within the parameter list viewer 242, at the same time as viewing the system diagram. Seeing both at the same time further enhances the user's ability to decide which parameters should be further studied. The user can also remove parameters from the list if the user determines the parameters are not useful for further study.

Some parameters can be selected via interfaces other than the system diagrams shown in FIGS. 2A-2C. For example, a user may request to add a derived parameter to the visualization, where the derived parameter is calculated based on two or more other parameters and not directly displayed on the system diagram of the system or environment. In another example, the visualization system can provide a list of parameters that may or may not be tied to a specific location on the system diagram, such as a temperature measurement outside the building or in the environment in which a machine is located, a total energy usage of a building, or a log or record of the times during a day that a machine was powered on or a building was occupied.

If the user hides or collapses the parameter list viewer 242, the state of the user-selected parameters can be retained in the persistent parameter list. Furthermore, the state of the persistent parameter list can be retained as the user navigates to other system diagrams. Thus, the user can collapse the parameter list viewer 242 to gain more visible area of the system diagram for visual navigation or to switch to other system diagrams (such as a different floor in the same building, a floor of a different building, a machine in a building, or a map of a geographic area).

Figure 4:
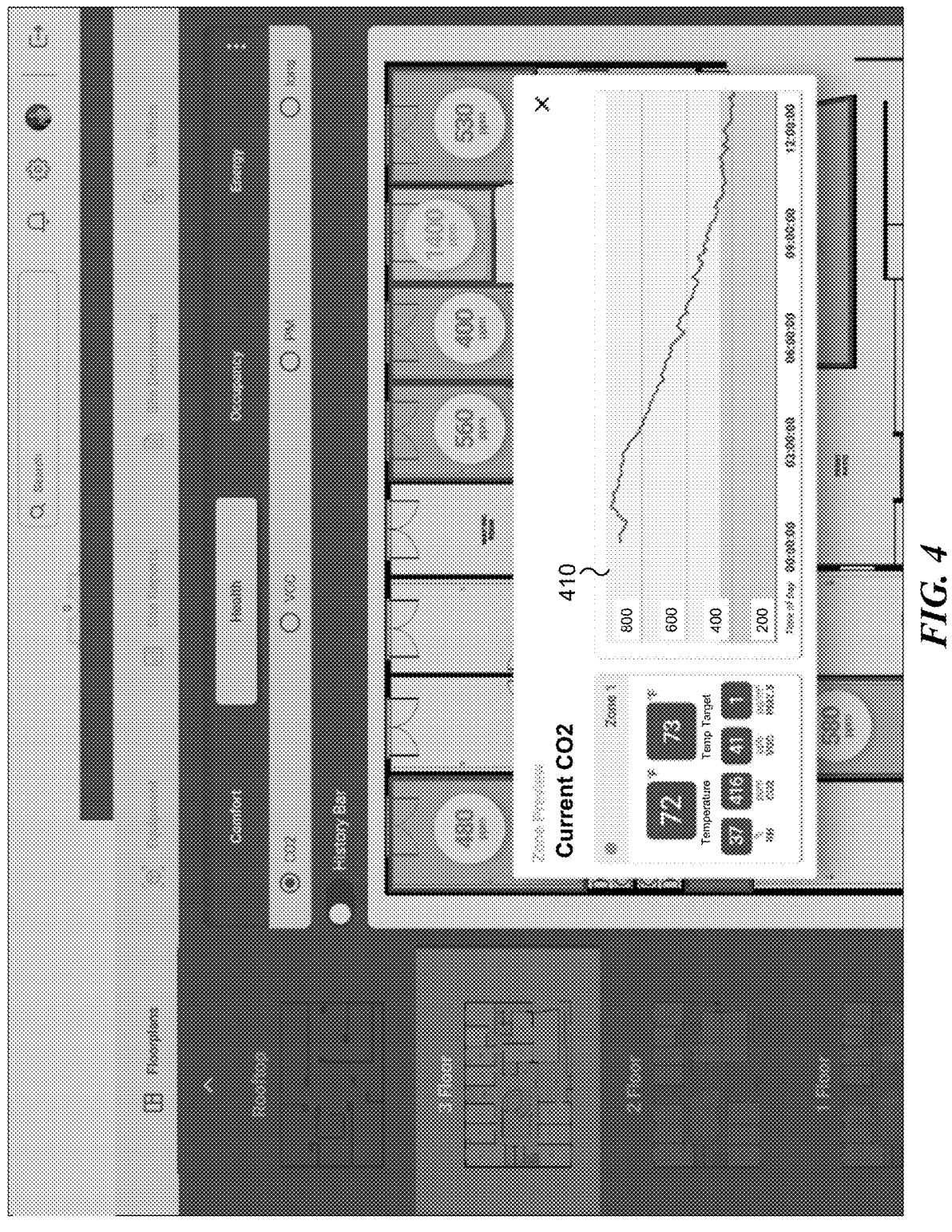
FIG. 4 illustrates an example visualization of a parameter.

Closing the parameter list viewer 242 can disable the visualization selection mode and thereby enable interaction with the parameter indicators to cause other events, such as displaying the recent history of a parameter on a line graph. For example, FIG. 4 illustrates that an indicator of carbon dioxide measurements in a given room of a building has been selected, in response to which the visualization system displays a history of the carbon dioxide measurements in the room as a line graph 410.

In some implementations, the visualization system provides an option to display an interactive history bar associated with one or more parameters. Such a history bar 510 is illustrated by way of example in FIG. 5. A user can interact with the history bar 510 to view the state of a parameter at different points in time, which can help the user decide whether to add a given parameter to the clipboard. The history bar 510 can be generated and displayed for a particular parameter or for a set of parameters. For example, in FIG. 5, the example history bar is associated with carbon dioxide measurements in a set of rooms in a floorplan system diagram 220. As the user moves a thumb 512 forward or backward along the history bar, the system diagram 220 can be updated to show the value of the associated parameter or sets of parameters at different points in time, for example by updating each of the carbon dioxide measurement indicators 222A to show the value of each of these parameters at different times corresponding to the relative position of the thumb 512 on the history bar 510. The user can manually move the thumb 512 on the history bar or can select a "play" button 514 to cause the visualization system 120 to animate changes to the parameters over the time period represented by the history bar. The user can therefore gain understanding about how the values have changed over a period of time and thereby identify parameters that may be interesting to visualize. The parameter list viewer 242 and the history bar 510 can be displayed at the same time, in some implementations, to enable the user to select parameters while examining historical data on a system diagram.

Figure 6:
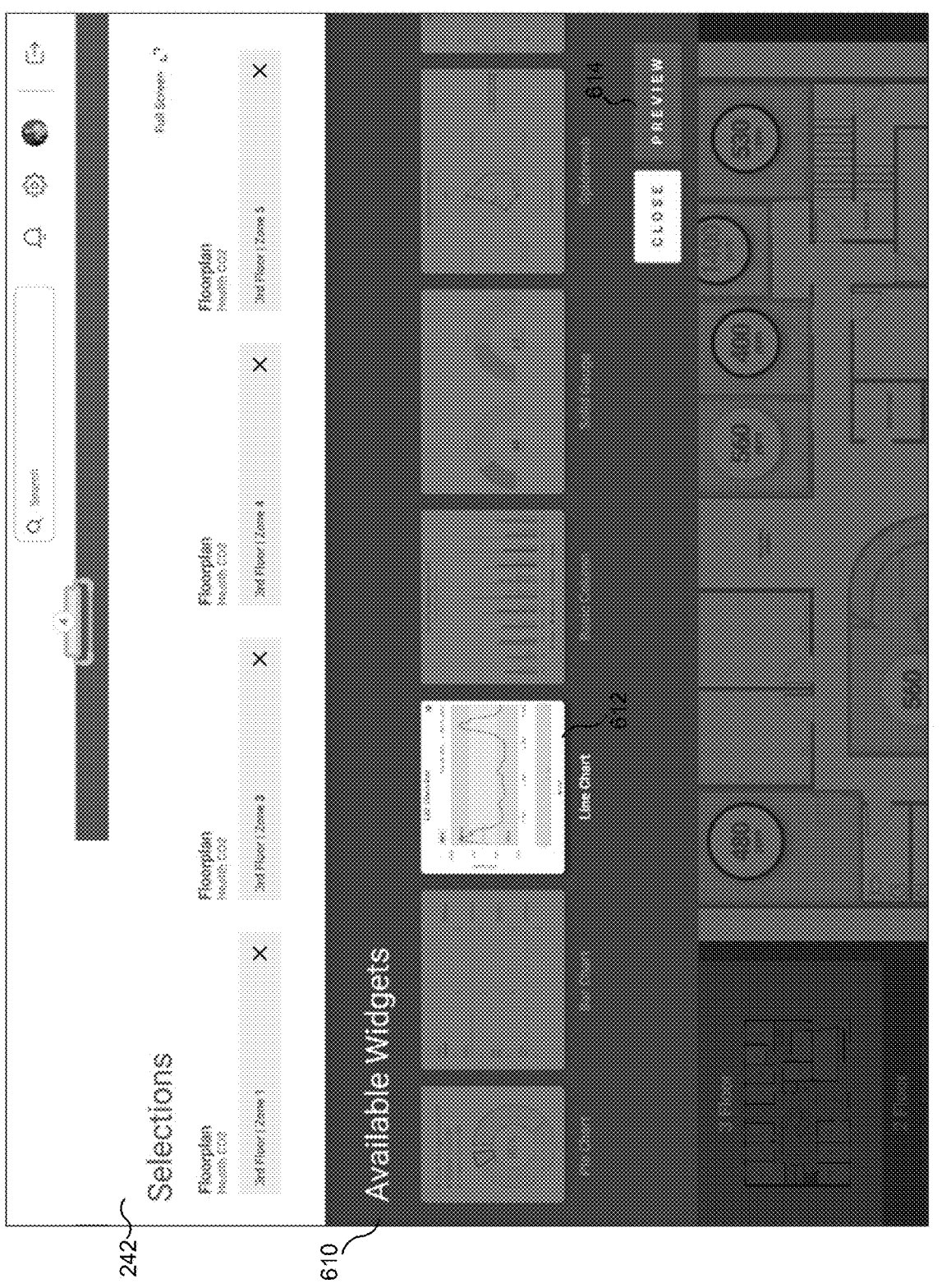
FIG. 6 illustrates an example user interface in which options for different types of visualizations are displayed.

After a user has selected one or more parameters, the visualization system 120 provides an option to generate a visualization of the parameters that have been added to the persistent parameter list. FIG. 6 illustrates an example user interface 610 in which the visualization system 120 provides options for different types of visualizations that can be generated for the parameters selected by the user. In the example of FIG. 6, the options are displayed within the clipboard user interface 242. While the parameter list viewer 242 is in the open or expanded state, the system diagram 220 can retain visibility and navigability to allow a user to access parameter visualization options while further visually exploring other elements of the system.

The visualization options displayed by the visualization system can include a preview 612 of the visualization type, as illustrated in FIG. 6. In some implementations, the visualization system generates the previews of the available visualization types using data associated with the parameters selected by the user. Alternatively, the previews can be generated using fake data.

In some implementations, the visualization system determines a recommended type of visualization based on the parameters selected by the user. For example, if the user selects two temperatures, the visualization system can recommend plotting the temperatures as line charts with time on the x-axis. If the user selects parameters that represent a number of different types of alerts generated in an area, the visualization system may recommend a pie chart. Alternatively, the visualization system can generate recommendations for visualization types to not use for the selected parameters. For example, if the selected parameters are temperatures, the visualization system can recommend the user not use a pie chart. The visualization system can rearrange an order of the visualization type options presented in the user interface of FIG. 6 based on these recommendations, for example by placing more suitable visualization types towards the left side of the display and less suitable visualization types towards the right side of the display. Alternatively, the visualization system can modify the way recommended or non-recommended visualization types are displayed. For example, non-recommended types can be grayed out or marked with a "not recommended" label. Recommended types can be highlighted or marked with a "recommended" label or star.

Figure 5:
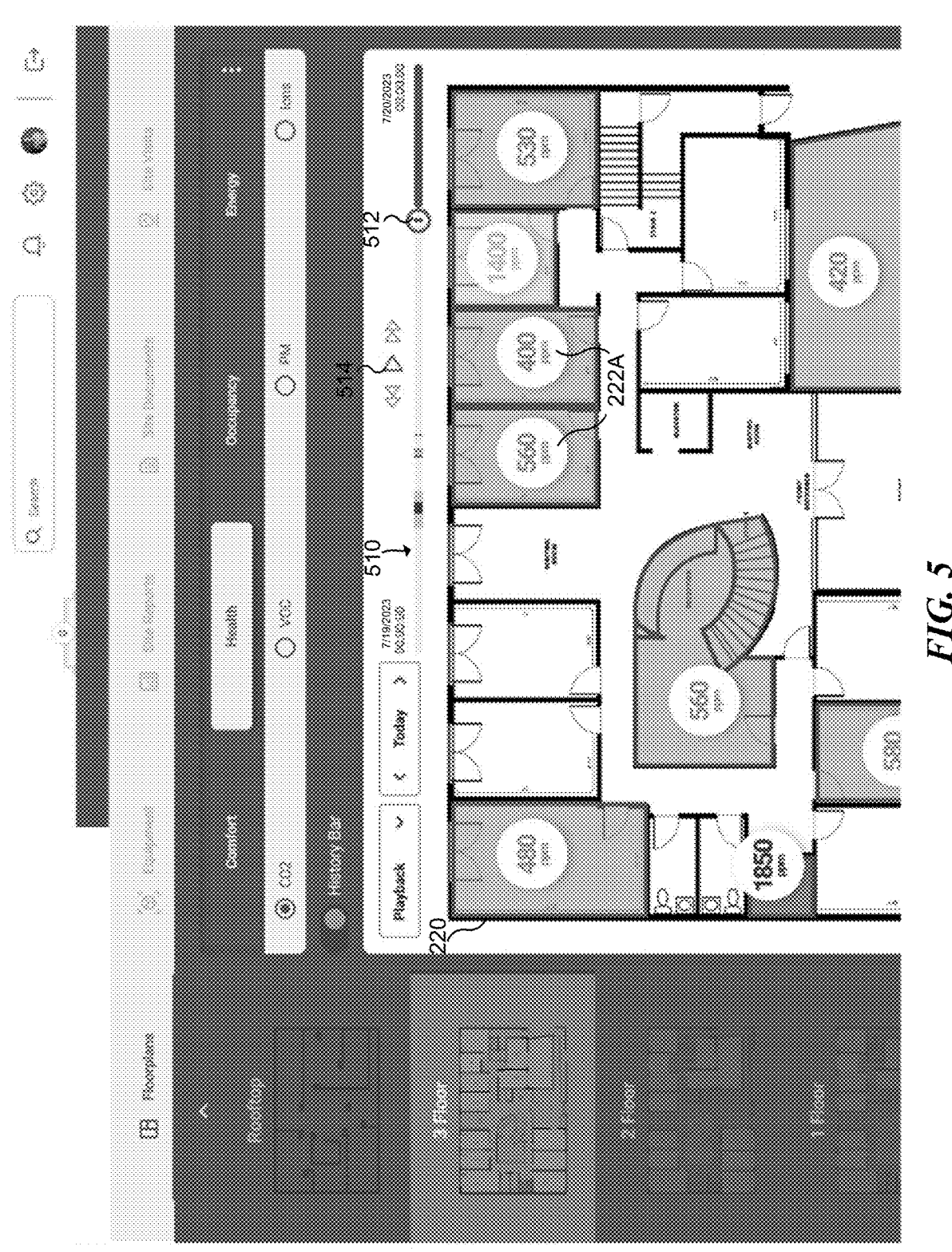
FIG. 5 illustrates an example user interface including a history bar.

In some implementations, the user can interact with the history bar shown in FIG. 5 to specify a time window over which a parameter will be visualized. For example, the user can select start and end times for the time window via the history bar 510. When the parameter visualization is generated, the visualization system will plot any values of the parameter between the selected start and end times. Alternatively, the visualization system plots a value derived from the parameter values between the selected start and end times. For example, the visualization system generates and plots an aggregate value of the parameter (such as a minimum or maximum value during the selected time window or an average of the parameter values during the selected time window) if the visualization type selected by the user is better suited to displaying this aggregate value.

In some implementations, the visualization system can recommend additional parameters to visualize with the user-selected parameters in the persistent parameter list. For example, the visualization system identifies a parameter whose present or historical values are highly correlated with a user-selected parameter or a parameter that is either derived from a user-selected parameter or from which the user-selected parameter is derived. In another example, the visualization system identifies a parameter that other users typically select for a visualization when the other users also select a given parameter.

The visualization system 120 can instead recommend that the visualization exclude one of the user-selected parameters in the persistent parameter list. For example, if the user selects both a first parameter and a second parameter, where the second parameter is derived from and always linearly correlated to the first parameter, the visualization system may recommend that the user exclude the first parameter from the visualization. In another example, the visualization system 120 recommends removing a parameter that is not meaningfully related to other parameters in the persistent parameter list, such as removing a parameter that describes an occupancy level of a room when the other parameters in the list relate to various temperature and pressure measurements in a machine. The visualization system can display a warning that a particular parameter is unrelated to other parameters or is not compatible with available visualization options.

Figure 7:
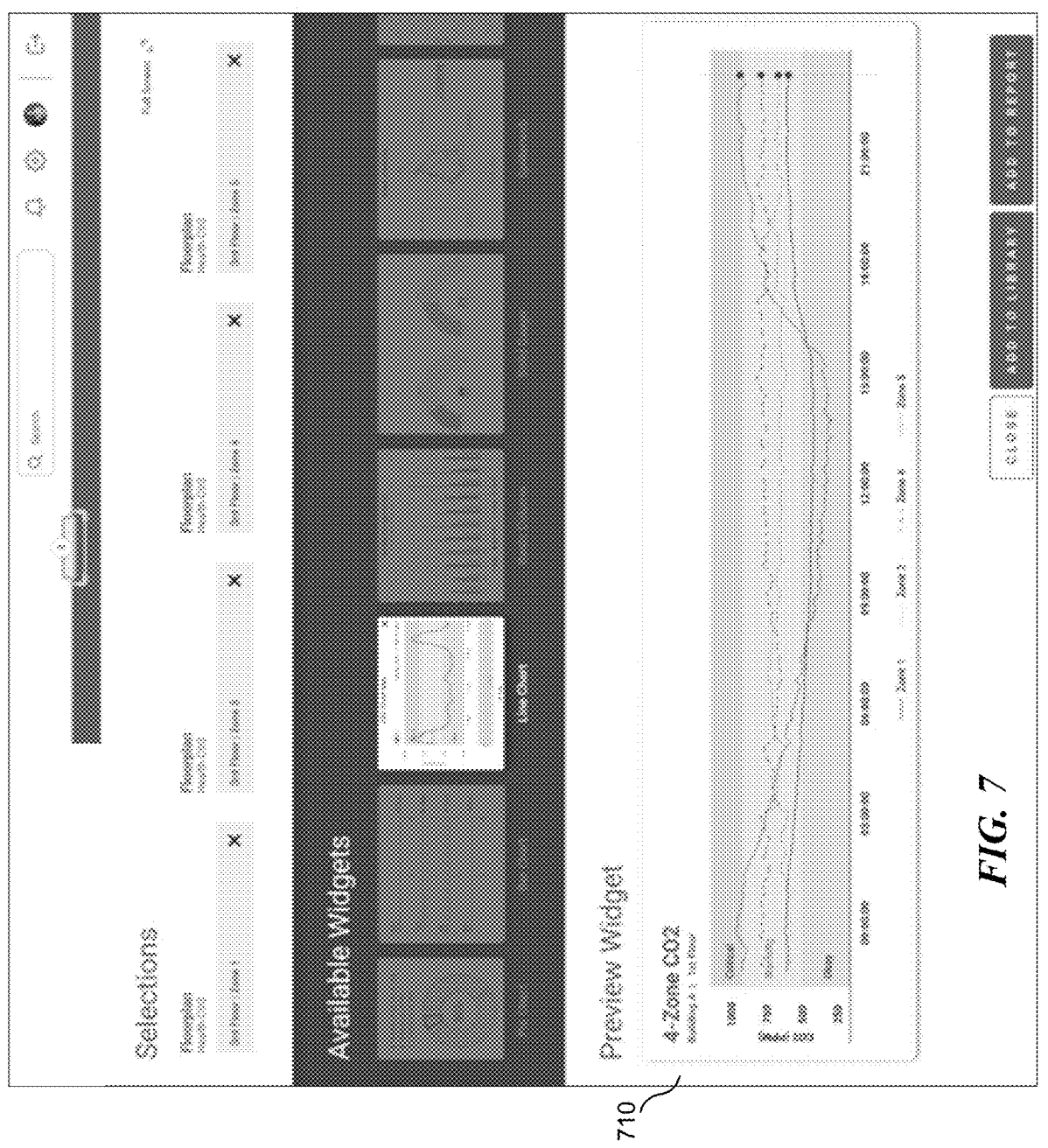
FIG. 7 illustrates an example preview of a visualization.

The user can select a visualization option from the user interface 610 and generate a preview of the resulting visualization (e.g., by selecting the "preview" button 614 in the interface 610). FIG. 7 illustrates an example preview 710. The preview can enable the user to view the visualization type in a larger format or with real parameter data if the visualization options were generated with fake data.

Once the user has selected the desired visualization type, the user can select an option to generate the visualization. In some implementations, a visualization generated by the visualization system 120 is a live or near-live visualization widget that is updated continuously or on a periodic basis to reflect changing values of the plotted parameters. Plotted within the visualization widget is parameter data measured over a predefined or user-selected window of time, such as the previous 24 hours. The visualization system can enable the user to modify the plotted window of time by interacting with the preview or the widget. Once generated, the widget can be added to a document, webpage, dashboard, or other external object or interface. For example, a widget can be embeddable within a dashboard or report. Alternatively, the widget can be added to a larger collection or library of parameter visualizations that can be accessed later for viewing the visualization within the widget or to add the widget to a document or dashboard. The visualization system 120 can also enable a user to modify the visualization widget, for example to remove one or more of the parameters from the visualization, to add one or more new parameters, to change a frequency at which the widget is updated, or to modify the window of time plotted within the widget.

In other implementations, the visualization system generates a static visualization based on values of the selected parameters that were measured before the visualization was generated. For example, a user can generate a static visualization of the behavior of a set of parameters during a specified window of time. The static visualization can be stored or added to a document, dashboard, or other object or interface.

Generating Visualizations of Complex Systems

FIG. 8 is a flowchart illustrating a process 800 for generating visualizations of complex systems, according to some implementations. Steps of the process 800 can be performed by a computer system, such as the visualization system 120. Other implementations of the process 800 include additional, fewer, or different steps, or perform the steps in other orders.

At 802, the computer system causes display of a user interface by a computing device. The computing device can be, for example, the computer system itself, a user device that is communicatively coupled to the computer system, or a set of multiple devices that communicate with each other. The user interface displayed by the computing device includes a system diagram viewer that is configured to display respective ones of a plurality of system diagrams that each visually represent a system or environment. Each of the plurality of system diagrams includes at least one selectable identifier that represents a parameter within the corresponding system or environment, and user inputs at the computing device to navigate between the plurality of system diagrams cause the computing device to display respective system diagrams from the plurality of system diagrams in the system diagram viewer.

At 804, the computer system receives a user interaction with at least a first selectable identifier on a respective system diagram.

In response to the user interaction, the computer system at 806 adds a first parameter, represented by the first selectable identifier, to the set of parameters maintained in the persistent parameter list.

At 808, the computer system generates a visualization of the set of parameters maintained in the persistent parameter list.

Computer System

Figure 9:
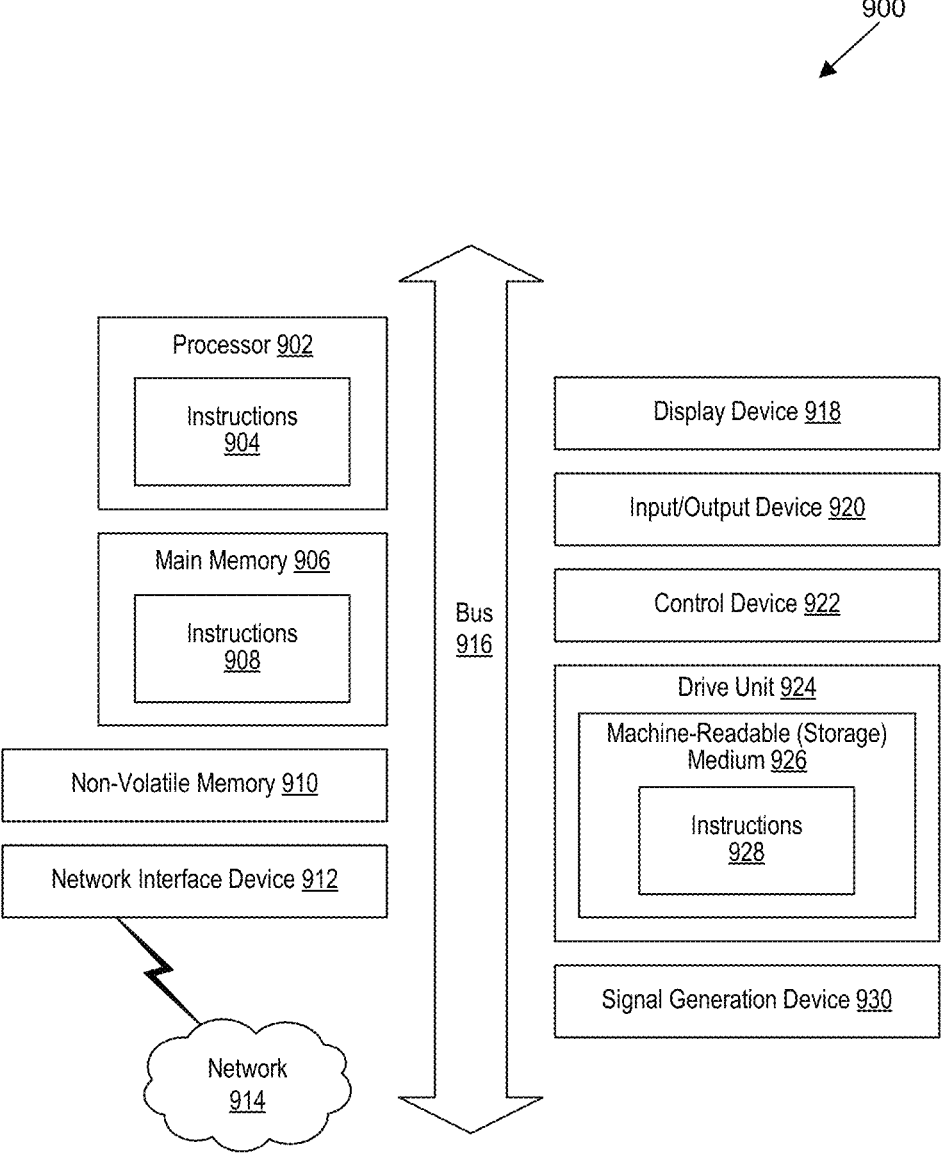
FIG. 9 is a block diagram that illustrates an example of a computer system 900 in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory computer-readable storage medium storing instructions, the instructions when executed by one or more processors of a computing system causing the computing system to perform steps comprising:

causing display, by a computing device, of a user interface including:

a system diagram viewer displaying respective ones of a plurality of system diagrams that each visually represent a system or environment, wherein at least one of the plurality of the system diagrams includes at least one selectable identifier that represents a parameter within the corresponding system or environment, wherein the at least one selectable identifier is displayed at a location on a system diagram of the plurality of system diagrams that corresponds to a location of the represented parameter within the corresponding system or environment, and wherein user inputs at the computing device to navigate between the plurality of system diagrams cause the computing device to display respective system diagrams from the plurality of system diagrams in the system diagram viewer; and a persistent parameter list associated with the plurality of system diagrams, wherein the persistent parameter list maintains a set of parameters selected by a user as the user interacts with the system diagram viewer;

receiving, at one or more of the plurality of system diagrams, a user interaction with a first selectable identifier on a respective system diagram;

in response to the user interaction, adding, to the set of parameters maintained in the persistent parameter list, a first parameter that is represented by the first selectable identifier; and generating a visualization of the set of parameters maintained in the persistent parameter list, wherein the plurality of system diagrams comprises one or more of:

a building floorplan;

a machine schematic; or a map of a geographic area.

2. The non-transitory computer-readable storage medium of claim 1, wherein the persistent parameter list is displayed within the user interface in a parameter list viewer, and wherein the steps further comprise:

displaying the parameter list viewer in a collapsed state;

receiving a user input to expand the parameter list viewer to display the parameter list viewer in an expanded state;

wherein the user interaction with the first selectable identifier is received while the parameter list viewer is displayed in the expanded state; and after receiving the user interaction with the first selectable identifier, receiving a user input to collapse the parameter list viewer to display the parameter list viewer in the collapsed state;

wherein the first parameter is maintained in the persistent parameter list while the parameter list viewer is displayed in the collapsed state.

3. The non-transitory computer-readable storage medium of claim 1, wherein the persistent parameter list is displayed within the user interface in a parameter list viewer wherein the visualization is generated in response to a user input received in the parameter list viewer.

4. The non-transitory computer-readable storage medium of claim 1, further comprising displaying a plurality of options for respective visualization types for the visualization.

5. The non-transitory computer-readable storage medium of claim 4, further comprising:

generating a recommended visualization type for the visualization based on the set of parameters maintained in the persistent parameter list;

wherein the plurality of options for respective visualization types includes the recommended visualization type.

6. The non-transitory computer-readable storage medium of claim 1, further comprising:

causing the computing device to display a preview of the visualization.

7. The non-transitory computer-readable storage medium of claim 1, wherein the steps further comprise:

after receiving the user interaction with the first selectable identifier, modifying an appearance of the first selectable identifier on the respective system diagram.

8. The non-transitory computer-readable storage medium of claim 1, wherein the user inputs to navigate between the plurality of system diagrams cause the computing device to:

navigate between the building floorplan and the machine schematic;

navigate between the building floorplan and the map of the geographic area; or navigate between the machine schematic and the map of the geographic area.

9. The non-transitory computer-readable storage medium of claim 1, wherein generating the visualization comprises:

generating a widget that contains a dynamic visualization of the parameters in the persistent parameter list; and embedding the widget in an object or interface.

10. A computing system comprising:

a communications interface;

one or more processors coupled to the communications interface; and one or more non-transitory media storing executable instructions, the instructions when executed by the one or more processors causing the computing system to:

receive, via the communications interface, values of at least one parameter measured in each of a plurality of systems or environments that are communicatively coupled to the computing system;

cause display, by a computing device, of a user interface including:

a system diagram viewer displaying respective ones of a plurality of system diagrams that each visually represent a corresponding one of the plurality of systems or environments, wherein at least one of the plurality of the system diagrams includes at least one selectable identifier that represents a parameter within the corresponding system or environment, wherein the at least one selectable identifier is displayed at a location on a system diagram of the plurality of system diagrams that corresponds to a location of the represented parameter within the corresponding system or environment, and wherein user inputs at the computing device to navigate between the plurality of system diagrams cause the computing device to display respective system diagrams from the plurality of system diagrams in the system diagram viewer; and a persistent parameter list associated with the plurality of system diagrams, wherein the persistent parameter list maintains a set of parameters selected by a user as the user interacts with the system diagram viewer;

receive, at one or more of the plurality of system diagrams, a user interaction with a first selectable identifier on a respective system diagram;

in response to the user interaction, add, to the set of parameters maintained in the persistent parameter list, a first parameter that is represented by the first selectable identifier; and generate a visualization of the set of parameters maintained in the persistent parameter list, wherein the plurality of system diagrams comprises one or more of:

a building floorplan;

a machine schematic; or a map of a geographic area.

11. The computing system of claim 10, wherein the persistent parameter list is displayed within the user interface in a parameter list viewer, and wherein the instructions when executed further cause the computing system to:

display the parameter list viewer in a collapsed state;

receive a user input to expand the parameter list viewer to display the parameter list viewer in an expanded state;

wherein the user interaction with the first selectable identifier is received while the parameter list viewer is displayed in the expanded state; and after receiving the user interaction with the first selectable identifier, receive a user input to collapse the parameter list viewer to display the parameter list viewer in the collapsed state;

wherein the first parameter is maintained in the persistent parameter list while the parameter list viewer is displayed in the collapsed state.

12. The computing system of claim 10, wherein generating the visualization comprises:

generating a widget that contains a dynamic visualization of the parameters in the persistent parameter list; and embedding the widget in an object or interface.

13. A method comprising:

causing display, by a computing device, of a first system diagram, wherein the first system diagram is one of a plurality of system diagrams that each visually represent a system or environment; and wherein at least the first system diagram of the plurality of system diagrams displays at least one selectable identifier that represents a parameter within the corresponding system or environment, wherein the at least one selectable identifier is displayed at a location on the first system diagram of the plurality of system diagrams that corresponds to a location of the represented parameter within the corresponding system or environment;

in response to receiving a user interaction with a first selectable identifier on the first system diagram, adding a first parameter that is represented by the first selectable identifier to a persistent parameter list;

receiving a user input to display a second system diagram of the plurality of system diagrams;

persistently maintaining the persistent parameter list while causing the computing device to display the second system diagram; and generating a visualization of a set of parameters maintained in the persistent parameter list, wherein the plurality of system diagrams comprises one or more of:

a building floorplan;

a machine schematic; or a map of a geographic area.

14. The method of claim 13, wherein the persistent parameter list is displayed by the computing device in a parameter list viewer, and wherein the method further comprises:

displaying the parameter list viewer in a collapsed state;

receiving a user input to expand the parameter list viewer to display the parameter list viewer in an expanded state;

wherein the user interaction with the first selectable identifier is received while the parameter list viewer is displayed in the expanded state; and after receiving the user interaction with the first selectable identifier, receiving a user input to collapse the parameter list viewer to display the parameter list viewer in the collapsed state;

wherein the first parameter is maintained in the persistent parameter list while the parameter list viewer is displayed in the collapsed state.

15. The method of claim 14, wherein the user input to display the second system diagram is received while the parameter list viewer is displayed in the expanded state.

16. The method of claim 13:

wherein the first system diagram and the second system diagram include:

the building floorplan and the machine schematic;

the building floorplan and the map of the geographic area; or the machine schematic and the map of the geographic area.

17. The method of claim 13, wherein generating the visualization comprises:

generating a widget that contains a dynamic visualization of the parameters in the persistent parameter list; and embedding the widget in an object or interface.

* * * * *